(12) United States Patent
Mauri et al.

(10) Patent No.: US 12,715,178 B2
(45) Date of Patent: Aug. 25, 2026

(54) MANUFACTURING PROCESS OF A NANOFIBROUS MEMBRANE REINFORCED COMPOSITE MATERIAL AND NANOFIBROUS MEMBRANE FOR SUCH A PROCESS

(71) Applicant: SAATI S.P.A., Appiano Gentile (IT)

(72) Inventors: Marco Mauri, Appiano Gentile (IT); Carmine Lucignano, Appiano Gentile (IT); Paolo Canonico, Appiano Gentile (IT)

(73) Assignee: SAATI S.P.A., Appiano Gentile (IT)

(*) Notice: Subject to any disclaimer, the term of this patent is extended or adjusted under 35 U.S.C. 154(b) by 215 days.

(21) Appl. No.: 18/700,932

(22) PCT Filed: Oct. 7, 2022

(86) PCT No.: PCT/IB2022/059585
§ 371 (c)(1),
(2) Date: Apr. 12, 2024

(87) PCT Pub. No.: WO2023/062491
PCT Pub. Date: Apr. 20, 2023

(65) Prior Publication Data

US 2025/0236077 A1 Jul. 24, 2025

(30) Foreign Application Priority Data

Oct. 14, 2021 (IT) ........................ 102021000026366

(51) Int. Cl.
*B29C 70/12* (2006.01)
*B29C 70/34* (2006.01)
(Continued)

(52) U.S. Cl.
CPC .............. *B29C 70/12* (2013.01); *B29C 70/34* (2013.01); *B29C 70/42* (2013.01); *B29C 70/682* (2013.01);
(Continued)

(58) Field of Classification Search
CPC ....... B29C 70/08; B29C 70/12; B29C 70/304; B29C 70/34; B29C 70/42; B29C 70/682
(Continued)

(56) References Cited

U.S. PATENT DOCUMENTS 6,265,333 B1 7/2001 Dzenis et al.
11,203,136 B2 * 12/2021 Hirawaki ................ B29C 43/34
(Continued)

FOREIGN PATENT DOCUMENTS

CN 112810259 A 5/2021
GB 2568105 A 5/2019

OTHER PUBLICATIONS

International Search Report for PCT/IB2022/059585 dated Jan. 12, 2023, 4 pages.
(Continued)

*Primary Examiner* — James D Sells
(74) *Attorney, Agent, or Firm* — NIXON & VANDERHYE

(57) ABSTRACT

It is disclosed a composite material and a process for producing such a composite reinforced material, comprising the steps of arranging a plurality of layers of reinforcing fibres, impregnating said layers with a resin-based matrix, laminating said layers of reinforcing fibres by addition of pressure and/or heat, placing between said layers of reinforcing fibres an intermediate layer of polymer nanofibers, wherein said intermediate layer of polymer nanofibers is interleaved between said layers of reinforcing fibres by laying a membrane of polymer nanofibers adhering to a
(Continued)

backing substrate before said lamination step, said membrane of polymer nanofibers being obtained by direct electrospinning on a backing substrate by a needleless technique, and wherein it is provided an anti-sinking feature before said lamination step, which prevents a early sinking of said membrane of polymer nanofibers into said resin-based matrix.

9 Claims, 3 Drawing Sheets

(51) Int. Cl.

| | |
|---|---|
| ***B29C 70/42*** | (2006.01) |
| ***B29C 70/68*** | (2006.01) |
| *B29K 101/10* | (2006.01) |
| *B29K 105/08* | (2006.01) |
| *B29K 307/04* | (2006.01) |

(52) U.S. Cl.
CPC .... *B29K 2101/10* (2013.01); *B29K 2105/089* (2013.01); *B29K 2307/04* (2013.01)

(58) Field of Classification Search
USPC ........................................................... 156/90
See application file for complete search history.

(56) References Cited

U.S. PATENT DOCUMENTS

| | | | |
|---|---|---|---|
| 2011/0259518 | A1 | 10/2011 | Tojo et al. |
| 2015/0086743 | A1 | 3/2015 | Lee et al. |
| 2016/0010249 | A1 | 1/2016 | Hwang |

OTHER PUBLICATIONS

Written Opinion of the ISA for PCT/IB2022/059585 dated Jan. 12, 2023, 7 pages.

* cited by examiner

MANUFACTURING PROCESS OF A NANOFIBROUS MEMBRANE REINFORCED COMPOSITE MATERIAL AND NANOFIBROUS MEMBRANE FOR SUCH A PROCESS

CROSS-REFERENCE TO RELATED APPLICATIONS

This application is the U.S. national phase of International Application No. PCT/IB2022/059585 filed Oct. 7, 2022 which designated the U.S. and claims priority to IT patent application No. 102021000026366 filed Oct. 14, 2021, the entire contents of each of which are hereby incorporated by reference.

FIELD OF THE INVENTION

The present invention relates to a manufacturing process for a composite material with a nanofibrous membrane and to a nanofibrous membrane for such a process.

TECHNICAL BACKGROUND

Composite materials are typically materials provided with a reinforcing component, normally consisting of high-strength fibres in random form or in the form of a fabric, and a matrix component, such as a resin, which holds the reinforcing component in place and protects it from the external environment.

The composite materials may have a thermoplastic nature or a thermosetting nature, depending on the matrix component employed. The reinforcing component can be in various forms such as long filament bundles, rovings, tows, chopped fibres, nonwoven fabrics, woven fabrics, mats, tapes, microspheres and nanospheres of various kinds, while the most commonly used types of fibres are carbon/graphite fibres, aramid fibres and glass fibres.

To assemble a structural piece, composite materials are typically laminated, adhering several thin layers together (pre-preg or resin impregnated during lamination) and applying pressure and heat to achieve curing or crosslinking.

One of the most significant problems that occur in composite materials is that of delamination, that is, a process of evolution of a fracture that propagates between one layer and another of the laminated composite.

For several years now, it has been found that this problem is greatly reduced if a certain amount of microfibres—i.e. fibres of a much smaller diameter than the diameter of the main reinforcing fibres—are arranged between one layer and another of the laminated composite, which effectively consolidate the layers together, acting as a filling and binder between the resin-matrix and the reinforcing fibre mat.

It has also already been proposed to generally use nanofibers obtained by electrospinning from a nozzle.

U.S. Pat. No. 6,265,333 describes for example a process of producing a prepreg composite material, wherein inclusion of micro and nanofibers of polymeric nature also obtained by electrospinning is envisaged.

As regards basic research, there are also some scientific articles dealing with similar techniques. For example T. Brugo a, R. Palazzetti, "The effect of thickness of Nylon 6,6 nanofibrous mat on Modes I-II fracture mechanics of UD and woven composite laminates" published in Composite Structures 154 (2016), pp. 172-178 describes an experimental characterization on carbon fibre and epoxy resin composites interlaced with Nylon 6,6 nanofibers. However, these prior art documents provide general information on the potential techniques that can be employed to reduce the problems of delamination with nanofibers, but they do not address the problems that are encountered in the industrial environment to practically reduce these theoretical and experimental concepts.

In particular, it has been noted that electrospinning techniques are virtually ideal for obtaining nanofibers to improve the toughness of composite materials, but then a satisfactory method has not yet been found to introduce nanofibers into composite materials with repeatability, speed and without negatively affecting the prepreg fabrics, requirements that are essential in an industrial production environment.

Further information about handling nanofibrous membranes is discloses in US2011/259518. Other examples of nanonfiber membrane composite are disclosed in in the field of materials US2016/010249, GB2568105, CN112810259 and US2015/086743.

SUMMARY

The object of the present invention is therefore to provide a composite material production process in which it is simple and relatively inexpensive to introduce polymer nanofibers to improve the toughness of the product with respect to delamination.

This object is achieved by means of a method and a membrane as disclosed in essential terms in the attached claims.

Specific and advantageous features are disclosed in the dependent claims.

In particular, according to a first aspect of the invention, it is disclosed a manufacturing method of a composite reinforced material, comprising the steps of

- arranging a plurality of layers of reinforcing fibres,
- impregnating said layers with a resin-based matrix,
- laminating said layers of reinforcing fibres by addition of pressure and/or heat, placing between said layers of reinforcing fibres an intermediate layer of polymer nanofibers, wherein

- said intermediate layer of polymer nanofibers is interleaved between said layers of reinforcing fibres by laying a membrane of polymer nanofibers adhering to a backing substrate on a first layer of reinforcing fibres before laying a second layer of reinforcing fibres and said lamination step,
- said membrane of polymer nanofibers being obtained by direct electrospinning on a backing substrate by a needleless technique, and wherein
- it is provided an anti-sinking feature before said lamination step, which prevents an early sinking of said membrane of polymer nanofibers into said resin-based matrix.

Preferably, said polymer membrane is obtained from a solution of PA 6 and solvent containing acetic acid and formic acid. The solution can comprise PA 6 in an amount of about 12% by weight.

According to a preferred embodiment, said resin-based matrix is a cross-linking thermosetting resin. Further, the composite reinforced material comprises layers of reinforcing fibres made of carbon.

According to another aspect, the amount of nanofibers adhered on said backing substrate for forming said polymer membrane are between 1 and 15 $g/m^2$.

Preferably, nanofibers making up said polymer membrane are of a size of about 100-150 nm.

According to another preferred aspect, said backing substrate is a easy-peel backing substrate made of bisiliconised paper web, which is removed before laying said second layer of reinforcing fibres and said lamination step.

Another relevant aspect is that the anti-sinking feature can consist of submitting said membrane of polymer nanofibers to an oil-repellent surface treatment or a treatment with materials having low affinity with said resin-based matrix before said step of laying.

According to a further aspect of the invention, it is provided a polymer membrane acting as an intermediate layer between layers of reinforcing fibres within a composite, resin-matrix material, which membrane comprises electrospun nanofibers spun with a needleless technique into a membrane deposited on a continuous backing substrate having an easy-peel surface.

BRIEF DESCRIPTION OF THE DRAWINGS

Further features and advantages of the process and the membrane according to the present invention will in any case become more evident from the following detailed description of a preferred embodiment of the same, provided purely by way of a non-limiting example and illustrated in the accompanying drawings, wherein.

DESCRIPTION OF PREFERRED EMBODIMENTS

Figure 1:
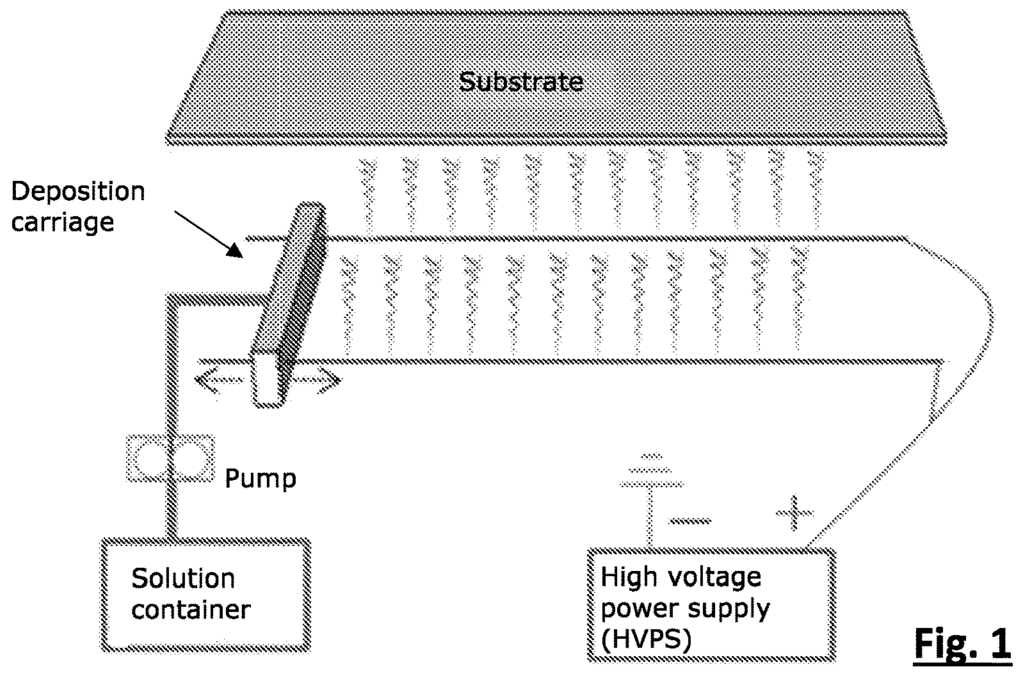
FIG. 1 is a schematic view of an exemplary membrane production plant according to the invention.
Figure 2A:
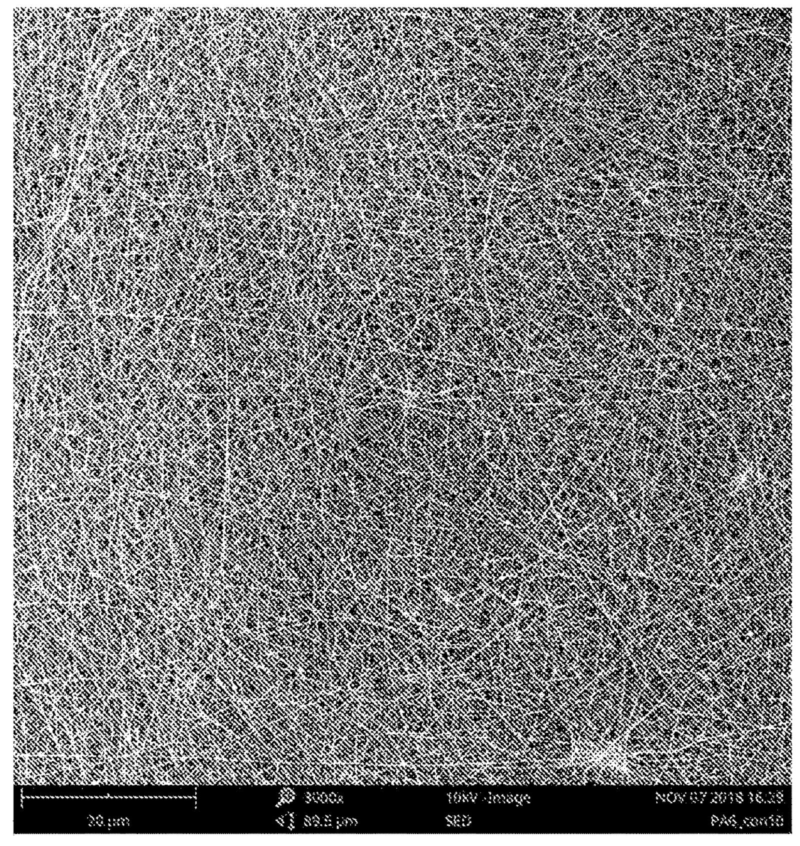
FIG. 2A-2D are SEM views at different magnifications of a membrane according to the invention.
Figure 2B:
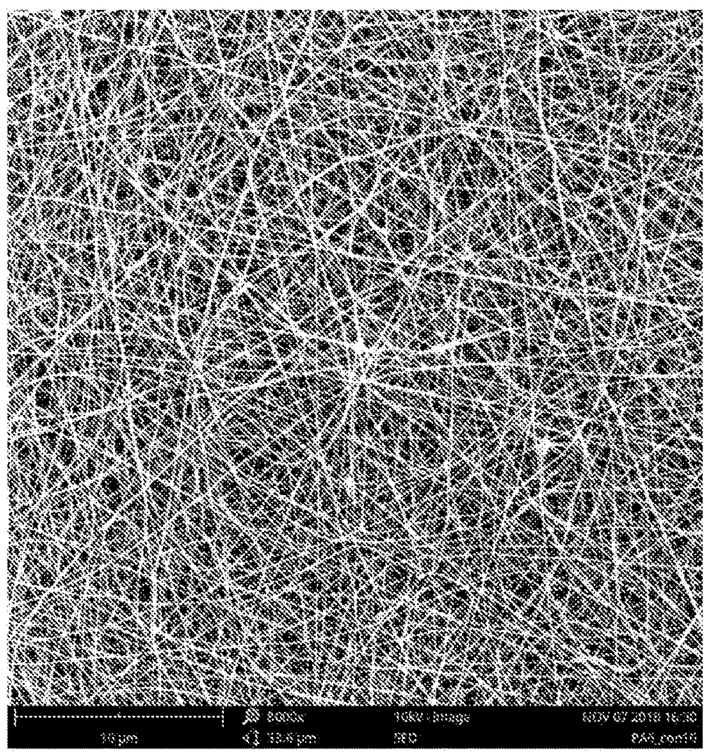
Figure 2C:
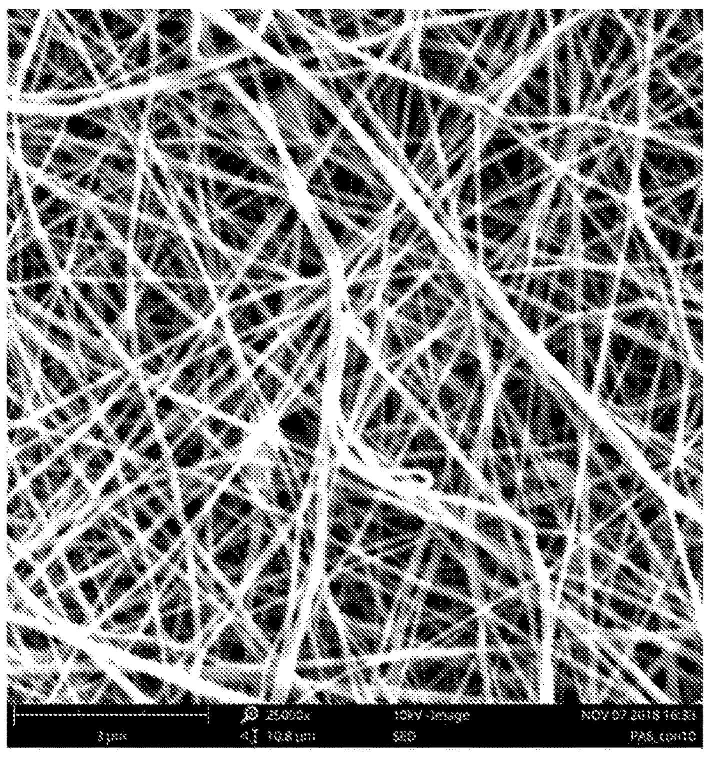
Figure 2D:
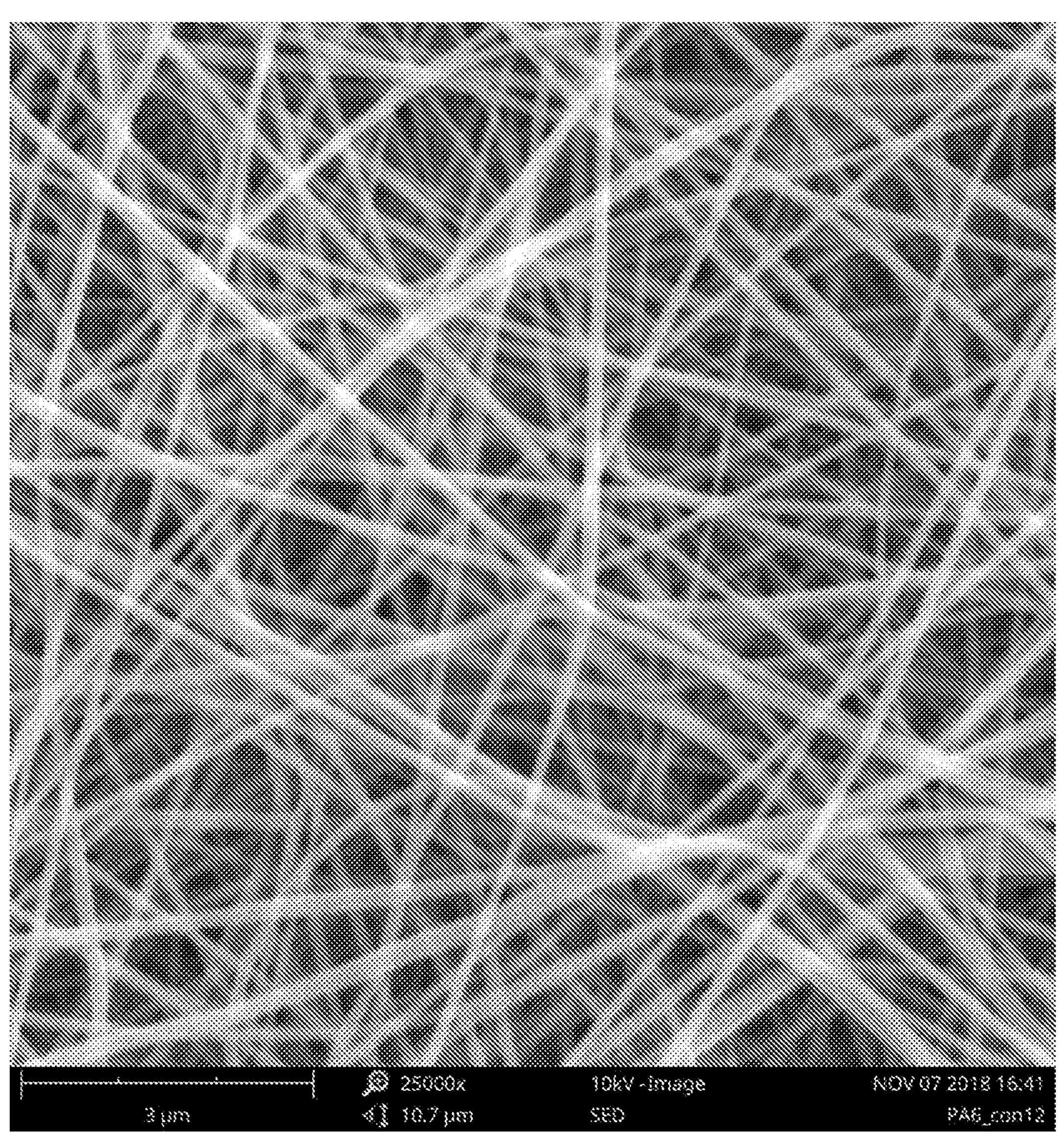

A composite material is prepared in a manner known per se, for example by weaving a fabric layer of reinforcing fibres, such as carbon fibres, and impregnating this with a suitable resin matrix, for example a cross-linking thermosetting resin such as epoxy resin. The resin impregnation may take place during the manufacture of the composite material or it may take place in a phase prior to a storage phase, thus providing a prepreg fabric.

The reinforcing fibre-based component—hereinafter referred to as the mat—can also be constructed in another way, for example as a non-woven fabric of cut fibres.

The starting composite material, whether it is only composed of reinforcing fibres or is a prepreg, is preferably in the form of a continuous mat roll.

In the preparation of a composite material product, two or more layers of reinforcing fibre mat are laminated onto each other, interposing or embedding the resin-based matrix.

Prior to lamination of two layers of composite material, an intermediate component based on nanofibers is interposed between them, preferably by laying the intermediate component on a first layer and then applying the other layer to this first layer.

According to the invention, the intermediate component consists of a nanofibrous membrane obtained by electrospinning a polymer, in particular a polymer membrane obtained from continuous electrospinning according to the methodology set out below. In this way, in fact, a continuous, homogeneous membrane is obtained, deposited on an easy-peel substrate, which makes the industrial incorporation process effective, as will be seen later.

For the manufacture of the nanofibre polymer membrane, an appropriate polymer solution is initially created. The polymer-solvent pair to be electrolyzed is chosen, which differs according to the desired polymer: according to a preferred embodiment, a pair of products that has proved particularly effective for this application in composite materials is polyamide 6 (PA6)—for example the trade name Ultramid B24N 03 produced by Basf—dissolved in a mixture of acetic acid and formic acid—for example the products marketed by Carlo Erba Reagents. An alternative polymer/solvent pair is for example polyvinylidene fluoride (PVDF) dissolved in dimethylacetamide or dimethylformamide, but there are also other technical polymers with specific characteristics that can be added, such as, but not limited to, polyimide, polyethersulfone, polysulfone, polycapolactone.

A viable solution process involves dosing the correct quantities of components to be prepared, to be placed in a suitable thermo-regulated container, for example with a thermoregulated vessel. The precise amount of solvent to be used for the preparation of the polymer solution is introduced into the container and to this it is added a metered amount of the polymer in the form of grains or powder. Preferably the system is capable of directly recovering the solvents employed from the raw material drums as delivered by the manufacturer and keeping them under continuous agitation by means of an internal stirrer. To facilitate solubilization of the polymer in the solvent, the contents are stirred by means of a mixer, within which they can also undergo a mild heating process to facilitate solubilization.

In the case of the preferred embodiment disclosed herein, it is appropriate to use a 12% by weight PA6 solution. For example, the following proportions are used for 1000 g of material:

120 g PA6 (12% by weight)
587 g Glacial acetic acid (58.7% by weight)
293 g Formic Acid (29.3% by weight)

The ratio between acetic and formic acids is 2:1 and remains constant even when the general concentrations of the solution are varied. For example, increasing the overall concentration of PA6 provides a proportional decrease of the two acids, while maintaining their ratio unchanged.

Once the solubilization is completed (clear solution) and the material is allowed to thermostat at room temperature, the solution is ready to be characterized before it can be electrospun.

Specifically, it is advantageous to perform 3 different characterizations, which are critical to obtain a stable and repeatable electrospinning process over time with the technology suggested here.

1) Evaluation of the viscosity (h) of the solution, using a rotational viscometer. In general, the viscosity values of a polymer solution are between 50 and 10000 mPa·s. Preferably, it is envisaged to use the solution with viscosity values ranging from a minimum of about 120 mPa·s to a maximum of about 900 mPa·s depending on the concentration of the solution.

2) Evaluation of the percentage concentration of the polymer solution, by the use of a thermal balance, which provides the concentration data directly, or by oven drying. In general, for polymer solutions the concentration values are in the range of 0.5% by weight to 30% by weight of the solution depending upon the type of polymer and the solvent system. Preferably, it is envisaged to use a solution with a concentration of a minimum of 8% by weight up to a maximum of 25% by weight.

3) Evaluation of electrical conductivity (e), by the use of a conductivity meter with immersion probe. The conductivity values must be between 1 and 5000 mS/cm.

For industrially optimized production, it was found that it is advantageous to use a quantity of 15-30 Kg of solution per production batch, so as to avoid aging phenomena on the polymer solutions produced, and a method of solubilization of the polymer in the solvent.

The polymer solution thus obtained is used according to the invention for the preparation of a nanofibrous membrane on easy-peel substrates of different kind, by means of a continuous electrospinning process with needleless electrospinning technique.

Needleless electrospinning ensures high productivity at an industrial level (in terms of $m^2$/h) compared to the needle systems mentioned in U.S. Pat. No. 6,265,333 and allows industrially effective materials to be obtained.

The membrane produced with this technique, though on the one hand having characteristics of dimensional homogeneity, comparable to other techniques for the production of microfibres (i.e. spunlace and meltblow), on the other hand can benefit from a much larger surface area (due to the nanodimensions of the materials) as well as the possibility of being handled and processed in the production processes even at low weights (up to 1 g/$m^2$) and with minimum thicknesses. These characteristics are crucial in order not to negatively affect the market requirements imposed for composite materials, such as lightness and overall thickness.

Suitable backing substrates on which to make the nanofibrous layer are of four different macro-types: monofilament fabrics with calibrated mesh, non-woven fabrics of various types and weights, mono/bi-siliconized papers with various weights and polymer films of various thicknesses and surface finishes (for example based on HDPE, LDPE, etc.). Particularly important for application related to the composite field is the choice of the material on which to electrospin the polymer solution. This must only have the function of a carrier, without altering the product's characteristics. The best choice for this type of application lies with bi-silicone papers, wherein the side in contact with the electrospun material has a release grade greater than the opposite side. This procedure allows rolls to be obtained with an adequate internal tension (avoiding unwinding problems). The choice of silicone paper allows the application of sufficient tensile stress to keep the material perfectly flat during the coupling phase on the coating lines, thus ensuring a perfect adhesion of the nanofibrous membrane to the resin used and the subsequent removal of the substrate without this causing breakage in the membrane or defects.

The release grade of the substrate must be accurately regulated to allow a perfect detachment of the membrane, but also adequate to ensure that the paper remains to protect the composite during the subsequent phases of cutting into sheets, especially in fields such as aerospace, where cleaning during said cutting phase is a mandatory requirement.

Needleless electrospinning technique is based on purely physical principles and does not imply any transformation of the material at the level of chemical bonds, a transformation that takes place instead within the solution, in a phase prior to electrospinning, or in subsequent surface treatments (for example plasma treatments).

As shown in FIG. 1, the needleless electrospinning equipment is based on the absence of a needle and static or rotating metal collector, but typically includes a pair of steel wires placed one above the other at a certain distance, which act respectively as an anode and cathode of the system. The number of these pairs of wires can vary in quantity from a minimum of one pair in the pilot plants to a maximum of 8 in the industry plants currently marketed.

During the electrospinning process, both conductive wires are crossed by electric current at a voltage difference ranging from a minimum greater than 0 kV to a maximum of 120 kV. The potential difference is required for the spinning process to occur. It is in fact the electric field that, based on the characteristics of the polymer solution, causes the latter to be cold "extruded" starting from the layer deposited on the cathode wire. The polymer solution travelling towards the anode wire, which attracts it, during the flight time becomes thinner and dries, due to the turbulent movements to which it is subjected, up to the point of impacting the substrate used on each occasion, which acts as a collector, and which flows at a certain distance. Therefore, between the pair of conductive wires that act as anode and cathode there is a virtual plane that intercepts the electric field, along which the substrate runs.

The distance between the lower wire (cathode) and the substrate is the working distance of the production line and is always shorter than the distance between the anode and the cathode.

For the deposition of the polymer solution on the wire acting as a cathode, the system is provided with deposition carriages. The latter have pass-through housings within which the cathode wire runs through. Inside each housing, a steel arrangement is located having a calibrated delivery orifice (from 0.5 mm to 0.9 mm) within which the cathode wire is positioned-avoiding creating contact between the various metal parts. This delivery orifice is positioned on the carriage as part of the polymer solution feed duct system. The polymer solution, placed in special containers with a controlled atmosphere (in order to avoid evaporation of solvent), is transferred, at the set flow rate, to the delivery orifices by means of one or more pumps controlled by the control panel of the production line. The polymer solution is thus deposited, as a thin film depending on the opening size of the delivery orifice, on the cathode wires during the sliding of the trolley along them, on an extension that can go from a minimum of 50 cm to a maximum of 200 cm depending on the production line.

The polymer solution is dispensed continuously regardless of the sliding direction, back and forth, of the carriage.

The substrate has a lateral extension of the same order of magnitude as the distance travelled by the carriage. The substrate is moved orthogonally to the sliding direction of the trolley, with a certain sliding speed.

In the case of particular substrates, the upper wires acting as anode can be replaced by a conductive mat, rotating at the same time as the substrate is moved, in order to guarantee a roll-to-roll process.

The entire electrospinning zone is located within an area defined as an "electrospinning chamber" which is at a controlled atmosphere, in particular controlled relative humidity and temperature.

The most significant parameters with which it is possible to act on this electrospinning process to affect the final properties of the resulting membrane are:

concentration of the polymer solution
viscosity of the polymer solution
electrical conductivity of the polymer solution
distance between electrodes (top and bottom)
applied electric field
relative humidity inside the electrospinning chamber
speed of movement of the deposition trolley
diameter of the steel orifice mounted on the trolley
diameter of the steel wire on which the polymer solution is deposited
repetition of system pumps
displacement speed of the substrate
type of substrate
voltage applied to the substrate air recirculation inside the chamber (inlet-outlet flow)

When forming, the nanofibers fly between the conductive wires and the collector, and are deposited on the substrate randomly, creating a three-dimensional structure, the weight and thickness of which depends on the displacement speed of the substrate and therefore on how many fibres are deposited on it. The weight of such a material having a three-dimensional structure is in the order of 0.1 g/m$^2$ when used as surface functionalization of materials for specific uses (for example air filtration), gradually becoming heavier up to a maximum of 15 g/m$^2$ when used to characterize a material that can be defined as "self standing", i.e. able to be handled without the need for a support. The amount of nanofibers deposited on the substrate, according to the invention, for the specific application as a reinforcing intermediate layer in composite materials, is preferably between 3 and 10 g/m$^2$ depending on the diameter of the nanofibers produced.

Experimental tests have shown that an amount of nanofibers around 3 g/m$^2$ in the composite material is sufficient to have a significant increase in performances about 40% more than the composite material not containing nanofibers. When a weight of about 7-8 g/m$^2$ is achieved with fibres diameter of around 100-150 nm, an increase in the composite fracture resistance of around 94% is obtained. At the same time it should be noted that even a membrane at the upper weight limits, for example 8-9 g/m$^2$ during the lamination process of the composite, is completely irrelevant with respect to the weight of the composite resin used, since these specific amounts are still below the error threshold with which the resin is generally added to the fibre fabric.

In order to obtain the best performance it is important to define some membrane and process parameters. In particular, in order to achieve maximum performance it is necessary to:

optimize the amount of resin used in relation to the thickness of the membrane optimize the amount of resin according to the diameter of the nanofibers and the pore size of the membrane porosity.

PA6 nanofibers may have a melting temperature greater than 200° C., for example 220° C., while polyimide nanofibers may have a melting temperature even greater than 300° C. This makes the resulting membrane suitable to be inserted in high temperature composites used in aerospace, where the high temperatures involved do not allow the use of the toughening additives traditionally used in the automotive sector.

With the nanofibrous membrane obtained according to the invention, it was found that the action of the nanofibers takes place mainly at the interface between the resin and the next layer of fibres, for example carbon fibres. The very high surface area and intrinsic porosity of the material (about 80% of the free area, as can be seen in the SEM photographs of FIGS. 2A-2D at different magnifications) and the strong oleophilia of the nanofibrous membrane ensure that during the subsequent hot lamination processes, with adequate pressure, it is completely incorporated by the fluid resin and immobilized inside it once the curing or cross-linking process is completed. The benefit obtained from the insertion of the nanofibers is clearly apparent during subsequent fracture strength tests made at the interface of different layers in the composite, i.e. at the point of greatest weakness of the material, where delamination typically occurs between the composite layers.

The composite material loaded with the nanofibers, having at the interface between the various layers of carbon fibre a matrix not only comprising resin but loaded with these very long fibres of nanometric diameter, due to the random but consistent and homogeneous deposition of the nanofibers during electrospinning with needleless technique, causes it to be homogeneously distributed within the resin itself. During the fracture tests (conducted for example through the international standard D5528-13) the presence of the nanofibers inside the resin results in a fracture not being able to propagate uniformly in the composite material, as would happen in a standard composite. This effect is supposed to be due to the fracture line encountering a barrier every time it shall pass through the layer of nanofibers incorporated into the resin. The better the interconnection between cured or crosslinked resin and nanofibers, the more convoluted the path of the fracture line will be and the greater the energy dissipated in the progress of the fracture, which slows down its course. This non-homogeneous movement of the fracture propagation leads to considerably increased material strength.

The backing substrate or carrier, on which the electrospun polymer membrane is formed and made to rest, is easily rollable and therefore can be stored prior to use. In particular, the deposition of the electrospun membrane on a siliconized paper substrate makes the release of the material easy once the coupling phase with the pre-impregnated material and the subsequent processing (for example cutting) is finished, does not cause breakage in the membrane itself and is not problematic for the final processing of the pieces by the end customer. Using a bi-silicon paper immediately makes it clear which side the membrane is deposited on, so it is immediately obvious which side is to be used during coupling with the impregnated composite material mat (brown silicone paper-white membrane layer).

During the industrial procedure of incorporating the nanofibers into the composite product, once the reinforcing fibre mat is impregnated with the resin matrix, it is possible to unroll and lay the backing substrate layer (in particular bi-silicon paper) with the polymer membrane facing the composite material mat. The adhesion force of the polymer membrane to the resin matrix on the composite mat is slightly higher than the detachment force between the membrane and the backing substrate layer: the subsequent continuous removal of the backing substrate layer leaves the membrane perfectly lying on the composite material, without producing lacerations in the nanostructure of the membrane, nor decompositions of the reinforcing fibres in the matrix (still having low viscosity at this stage) of the composite material.

Once the supporting layer has been removed, a subsequent layer of composite material can be laminated above the first layer equipped with a polymer membrane, the latter being intimately incorporated between the two layers also with the aid of the lamination pressure and possibly of the lamination heat (which makes resin more fluid).

In order to optimize the toughening properties of the composite material, according to the invention it is important to ensure that the nanofibrous membrane layer does not sink in the prepreg but remains on the surface of the resin material (a resin thin film coating the prepreg composite mat), at the interface with the other prepreg layer with which it will be laminated. This potentially critical situation is to be avoided, as it could lead to a reduction of the advantage resulting from the use of the intermediate nanofibrous layer.

To this purpose, in the manufacturing method of the invention it is advantageously provided to arrange an anti-sinking feature, which prevents the early sinking of nanofibrous membrane into the resin matrix. A number of different anti-sinking measures may be considered for this purpose:

An option can entail optimization of the final thickness of the nanofibrous layer: greater thicknesses can allow the sinking phenomenon not to occur or to occur only minimally, thus minimizing the loss of performance.

A relevant embodiment consists of an oil-repellent surface treatment deposited on the layer of nanofibrous material membrane: this solution, by decreasing the resin's ability to wet and incorporate the nanofibers, could prevent the phenomenon described above from occurring over time.

In an other embodiment, the use of more oil-repellent technopolymers—i.e. having surface energy lower than 30 mN/m—or those with a lower intrinsic affinity to the resin for manufacturing the nanofibrous membrane, due to the chemical nature of the material can prevent the development of this phenomenon.

Finally, another feasible option provides to use an intermediate layer made of a thin homogeneous substrate of microfibrous material, for example wetlaid or melt-blown substrate made of low surface energy polymers (<30 mN/m), attached to the nanofibrous membrane layer. The microfibrous material thin layer is able to act as a mechanical support for the nanofibrous membrane avoiding its sinking into the resin. Furthermore, a substrate of this type, if appropriately chosen, can provide further reinforcement to the final composite and can avoid the need to provide a backing substrate to be removed in the subsequent processing steps of the prepreg or composite.

With a view to the development of new and increasingly industrially efficient materials, it is also envisaged to employ treatments designed to modify the reactivity of the membrane surface. For example, treatments aimed at increasing the hydrophilicity of the surface, or plasma treatments that simultaneously increase the surface roughness and create free radicals or reactive chemical species on the surface, in order to further improve the nanomaterial-resin adhesion, so as to further influence the increase in performances.

As can be understood from the description provide above, the method according to the invention allows the purposes stated in the introduction to be fully achieved.

The electrospinning and subsequent deposition of the polymeric nanofibrous membrane on the easy-peel backing substrate allows an efficient industrial process to be carried out. The backing substrate can be peeled out during application, for example when made of release paper, or can remain in the composite material, for example when made of microfibrous material. The numerous adjustment parameters available in the production of the polymer nanofibrous membrane allow the consistency and reactivity of the membrane to be adjusted freely depending on the nature and sizing of the components present in the composite material.

It is understood that the invention is not to be considered as limited by the particular embodiments described and illustrated, but that different variants are possible, all within the reach of a person skilled in the art, without departing from the scope of protection of the invention itself, which is exclusively defined by the following claims.

The invention claimed is:

1. A method of manufacturing a composite reinforced material, comprising the steps of arranging a plurality of layers of reinforcing fibres, impregnating said layers with a resin-based matrix, placing between said layers of reinforcing fibres an intermediate layer of polymer nanofibers, laminating said layers of reinforcing fibres by addition of pressure and/or heat, wherein said intermediate layer of polymer nanofibers is interleaved between said layers of reinforcing fibres by laying a membrane of polymer nanofibers adhering to a backing substrate on a first layer of reinforcing fibres before laying a second layer of reinforcing fibres and said lamination step, said second layer of composite material being laminated above the first layer equipped with a polymer membrane once the backing substrate has been removed, the polymer membrane being intimately incorporated between the first and second layers also with the aid of the lamination pressure, said membrane of polymer nanofibers being obtained by direct electrospinning on said backing substrate by a needleless technique, and wherein an anti-sinking feature is provided before said lamination step, to ensure that said polymer nanofiber membrane layer does not sink in the impregnated first layer but remains on the surface of resin-based matrix material, at the interface with the other impregnated second layer with which it is to be laminated.

2. The method as in claim 1, wherein said polymer membrane is obtained from a solution of PA 6 and solvent containing acetic acid and formic acid.

3. The method as in claim 2, wherein said solution comprises PA 6 in an amount of about 12% by weight.

4. The method as in claim 1, wherein said resin-based matrix is a cross-linking thermosetting resin.

5. The method as in claim 4, wherein said composite reinforced material comprises layers of reinforcing fibres made of carbon.

6. The method as in claim 1, wherein the amount of nanofibers adhered on said backing substrate for forming said polymer membrane are between 1 and 15 $g/m^2$.

7. The method as in claim 1, wherein the nanofibers making up said polymer membrane are of a size of about 100-150 nm.

8. The method as in claim 1, wherein said backing substrate is an easy-peel backing substrate made of bisiliconised paper web, which is removed before laying said second layer of reinforcing fibres and said lamination step.

9. The method as in claim 1, wherein said anti-sinking feature consists of submitting said membrane of polymer nanofibers to an oil-repellent surface treatment or a treatment with materials having low affinity with said resin-based matrix before said step of laying.

* * * * *